United States Patent [19]

Swanson

[11] Patent Number: 5,390,314
[45] Date of Patent: Feb. 14, 1995

[54] METHOD AND APPARATUS FOR DEVELOPING SCRIPTS THAT ACCESS MAINFRAME RESOURCES THAT CAN BE EXECUTED ON VARIOUS COMPUTER SYSTEMS HAVING DIFFERENT INTERFACE LANGUAGES WITHOUT MODIFICATION

[75] Inventor: Jim A. Swanson, Dallas/Fort Worth Airport, Tex.

[73] Assignee: American Airlines, Inc., Dallas/Fort Worth, Tex.

[21] Appl. No.: 958,962

[22] Filed: Oct. 9, 1992

[51] Int. Cl.$^6$ ............................................. G06F 15/38
[52] U.S. Cl. ..................................... 395/500; 395/250; 395/650; 395/700; 364/DIG. 1
[58] Field of Search ................ 395/500, 650, 700, 250

[56] References Cited

U.S. PATENT DOCUMENTS

| | | | |
|---|---|---|---|
| 4,961,133 | 10/1990 | Talati et al. | 395/700 |
| 5,159,687 | 10/1992 | Richburg | 395/700 |
| 5,179,703 | 1/1993 | Evans | 395/700 |

OTHER PUBLICATIONS

Notkin et al., "Heterogeneous Computing Environments:Report on the ACM SIGOPS Workshop on Accommodating Heterogeneity," *Communications of the ACM*, vol. 30, No. 2, Feb. 1987, pp. 132–140.

*Primary Examiner*—Robert B. Harrell
*Assistant Examiner*—William M. Treat
*Attorney, Agent, or Firm*—Jones, Day, Reavis & Pogue

[57] ABSTRACT

A system for converting software commands generated in a UNIX-based first programming language environment to software commands that operate in a second programming language environment. A first computer system generates input data signals in a first program language. A plurality of vendor second computer systems each have a second high-level program language different from each other and different from the first program language. A translation device is interposed between the first computer system and the plurality of second computer systems for storing a plurality of translation command rules for performing each high-level language program designated by an input data signal. The translation device receives a data command signal in the first program language containing a vendor identification data portion and a command data portion in the programming language of the UNIX-based first system and provides a corresponding output command signal in the language of any selected one of the vendor second computer systems.

10 Claims, 2 Drawing Sheets

METHOD AND APPARATUS FOR DEVELOPING SCRIPTS THAT ACCESS MAINFRAME RESOURCES THAT CAN BE EXECUTED ON VARIOUS COMPUTER SYSTEMS HAVING DIFFERENT INTERFACE LANGUAGES WITHOUT MODIFICATION

FIELD OF THE INVENTION

The present invention relates generally to the field of network management systems for data communications networks and in particular to a system for converting software commands generated in a first programming language environment to software commands that operate in one of a plurality of second programming language environments.

BACKGROUND OF THE INVENTION

The following are definitions of terms that will be used throughout the specification.
- UNIX TM —An operating system that controls computer hardware.
- HLLAPI—High-level language application programmer interface—libraries of program commands provided by various vendors to operate a particular computer system.
- SSI TM —A high-level language application program.
- HCON TM —A high-level language application program provided IBM TM.
- AAPI TM —A high-level language application program provided by American Airlines TM.
- SABRE TM —American Airlines reservation computer system.
- SCRIPT —A group of program commands to a computer system.
- SHELL —Known computer program languages such as BOURNE, C, KORN, REXX, and the like.
- SCIP TM —The Shell communication interface program system of the present invention.

Historically, large corporations have centralized their data processing on large mainframe systems. Recently, these corporations have found it more cost effective to decentralize their departmental computing onto UNIX Systems. Unfortunately, UNIX and mainframe systems are not compatible. However, there are software packages which will allow UNIX users to communicate with the mainframes by emulating 3270 terminals. Several vendors offer 3270 emulation software packages including SSI and IBM. The SSI package is available for a variety of platforms and includes a complete implementation of the HLLAPI interface to 3270 emulation. The HCON package from IBM is available only for the IBM RS/6000 and offers the HLLAPI interface.

Providing the UNIX user with host-terminal emulation allows the user to access the host databases, upload and download data files and the like; however, this requires a considerable amount of operator intervention.

The present invention is a method and apparatus that provide the user with the ability to automate host tasks from any of the standard UNIX Shell languages and operate as a front end to the HLLAPI and Sabre interfaces available for the UNIX environment. The present invention is implemented as a UNIX utility providing host emulation capabilities along with the power and flexibility of the standard UNIX shell scripts. As a result, the user is allowed to-incorporate the functions of the present invention into the Shell language of their choice such as BOURNE, C Shell, KORN, REXX, and the like.

To incorporate the SCIP function of the present invention into a shell script, the user must first call SCIP to initiate a host conversation with the apparatus, open the host session, perform the host tasks and then close the session. When the conversation is initiated, a block of shared memory is allocated. This shared memory is used to maintain session information between subsequent calls to SCIP with the apparatus. Each time a new host session is opened, it is assigned a portion of the shared memory. If the command is not an "open" command, the shared memory is accessed to determine the last state of an existing program. This allows data for multiple sessions to be held in storage simultaneously and thus multiple sessions may be operated simultaneously through the use of multiplexing the command signals. The user may interactively switch between sessions by setting the SCIP apparatus to "setsession". All communications are then performed against the current session until another "setsession" process is established.

The SCIP translation command is used as a regular UNIX command in a shell script or is presented from a terminal. Since the SCIP translation command process exists only as long as it takes a single command to execute and terminate, it is necessary to maintain session connectivity information in a persistent area. This can be done in either a file or a shared memory. For the present invention, a shared memory is used. A shared memory under some UNIX Scripts requires a unique integer "key" for identification. When a process attaches or creates a shared memory segment, it uses the key as a global identifier. Thus without careful key management, it is possible that another programmer might accidentally use the same key which would probably destroy the contents of the shared memory segment and cause unpredictable behavior. This key can be generated from an entry in the filesystem which, when coordinated, prevents one program from accidentally using another program's key. The UNIX System V function is "ftok()", which returns the unique integer key based upon information associated with a file in the filesystem. This provides some insurance that the key will not be duplicated by another programmer as long as other programmers also use the same function. In addition to using the ftok() function to generate the key, the shared memory segment has user, group and world read-write permissions. If the SCIP program is configured to run "set-uid" under a SCIP login id, then only processes running as the user SCIP will be able to access the shared memory segment that it creates. This isolates any exposure from outside programmers from accidentally corrupting the shared memory segment. The present SCIP apparatus uses the shared memory segment to keep connectivity information and environment variable information necessary to communicate with the various 3270 emulation libraries such as HCON, SABRE or SSI. Upon its first invocation, the SCIP program tries to attach a shared memory segment using a predetermined filename (SCIP_SHM) for a key, or, if the predetermined filename is not set, it generates its own. If the segment does not exist, it creates it.

Each time a segment is opened, connectivity information for that session is stored in a record in the shared memory segment. Each time a session is closed, after the driver-specific shutdown is performed, the record in shared memory is marked as "free". When all records in shared memory are marked "free", the shared memory segment (and its key) is deleted. The file used to generate the key can exist anywhere in the filesystem so long as it can be created as a real file by the SCIP translation program. The first time the SCIP translation program tries to attach to shared memory, if it does not find a shared memory segment, it creates one. When an open command is called, an unused record in the shared memory segment is selected and marked as the current session. Other sessions in progress can be used by using the "setsessions" which marks them as the current session. If no records are available, then the "open" command will fail.

A critical part of the design of the SCIP translation program is to allow the addition of new emulator support without impacting current support. In addition, it is desirable that the user be able to link in their own modules in order to expand the SCIP application program interfaces as needed. The present SCIP system uses a two-level dispatch table to route commands to the appropriate functions. The dispatch table consists of an array of structures which contain entries for global commands, each emulator type and user defined commands. Each of these entries contains a pointer to another array of structures containing the list of supported commands and the address of the function associated with the command.

Thus the system converts software commands generated in a first programming language environment to software commands that operate in one of a plurality of second programming language environments. A first computer system generates a program command signal in a first program language. A plurality of second vendor computer systems all have a second high-level language program different from each other and different from the first program language. The translation device is interposed between the first computer system and the plurality of second computer systems for storing a plurality of translation command rules for performing each high language level program designated by a program command signal. The SCIP translation device receives the input data signal in the first program language containing a vendor identification data portion and a program command data portion in the programming language of the first system and provides a corresponding output program command in the language of any selected one of the vendor computer systems.

The translation device consists of the first and second level dispatch tables plus a shared memory segment. The first level dispatch table is a channel selection station that identifies the types or class of computer systems having high-level languages such as SSI, HCON and AAPI that can be accessed by the system. The second level tables form a plurality of command channels, a corresponding one of which is designated for each of the high-level languages. Within each second level table is a list of the commands. Thus in the first level, an input command signal is received from the first computer system that includes a command portion that designates a function to be performed by one of the designated class of second vendor computer systems. The second level consists of a plurality of command dispatch units, or command channels, with each unit generating selected signals representing particular high-level language functions to be performed by a selected one of the second plurality of vendor computer systems according to the command data portion of the input data signal. The first level class table forwards the command portion of the data to the second level command table dispatch unit corresponding to the vendor identification portion of the input data signal.

An interface library memory is coupled to each of the command dispatch units for storing data in the first program language representing a plurality of high-level language command functions for each of the second vendor computer systems. A vendor library memory is coupled to the interface library and stores command functions/function rules in the second language to enable the selected one of the second plurality of vendor computer systems to perform the command. A shared memory segment is coupled to the interface library, the class dispatch table in the first level and the output of the vendor library for storing the data representing the vendor identification portion of the given input data signal to enable the appropriate interface library data to be selected that will designate the appropriate vendor library data and cause a command function to be performed by the selected one of the second vendor computer systems.

Thus it is the object of this invention to provide a method and apparatus to develop a script of commands on a first computer system that interfaces with a second computer system and that can be executed on, or by, a different first computer system to provide the same function without requiring any modifications.

It is also an object to the present invention to provide a method and apparatus for interfacing one program language with a selected one of a plurality of second program languages by using a first level table to receive an input data signal and select a designated one of a plurality of second level tables, each second level table containing commands for a designated one of the second program languages and a shared memory for storing data designating connectivity information for a selected second program language computer system.

It is still another object of the present invention to connect a host computer system utilizing a first program language to one of a plurality of vendor computer systems each using a unique second program language by initiating a host conversation, operating the host session, performing the host tasks and closing the session.

SUMMARY OF THE INVENTION

Thus the present invention relates to a system for converting software commands generated in a UNIX-based first programming language environment to software commands that operate in one of a plurality of second programming language environments, the system comprising a first computer system for generating input data signals in a UNIX-based first program language, a plurality of second vendor environments each having a second high-level program language different from the others and different from the first program language and a translation device interposed between the first program language and the plurality of second program languages for storing a plurality of translation command rules for performing each high language level program designated by an input data signal, the translation device receiving an input data signal in the first program language containing a vendor identification data portion and a program command data portion in the programming language of the UNIX-based first system and providing a corresponding output program command in the language of any identified one of the vendor environments.

BRIEF DESCRIPTION OF THE DRAWINGS

These and other objects of the present invention will be more fully disclosed in conjunction with the following detailed description of the drawings in which like numerals represent like components and in which.

PIG. 3 is a block diagram of the entire SCIP translation system of the present invention.

DETAILED DESCRIPTION OF THE DRAWINGS

Figure 1:
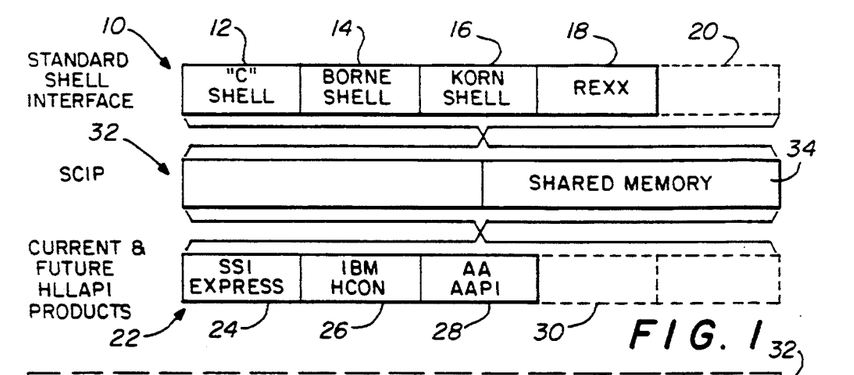
FIG. 1 illustrates the SCIP translation device of the present invention including a shared memory interposed between a plurality of computer systems utilizing standard Shell interfaces such C Shell, BOURNE Shell, KORN Shell and the like and the plurality of second vendor environments each of which has a second high level language program different from each other and different from the first program language.

As stated earlier, the translation of the present invention is implemented as a UNIX utility providing host emulation capabilities along with the power and flexibility of the standard UNIX shell scripts. Thus the SCIP translation device provides a middle layer between standard UNIX Shells and most HLLAPI products. Shown in FIG. 1, the standard Shell interfaces 10 include C Shell 12, BOURNE Shell 14, KORN Shell 16, REXX 18 and any future Shell product 20 that one may wish to add to the system. The current HLLAPI products 22 include the SSI Express 24, IBM HCON 26, and American Airlines AAPI 28. Future products 30 again may be added as needed. The SCIP translation program 32 of the present invention including shared memory 34 is interposed between the standard Shell interfaces 10 and the current and future HLLAPI products 22. The system in FIG. 1 therefore allows the executing of scripts on systems even with different connectivity products. No conversion is required with respect to any of the interface commands between UNIX and any connectivity product. In FIG. 1, the first computer system using the standard Shell interface 12, 14, 16, 18 or 20 generates the program command signals in a first program language as indicated earlier. The plurality of second vendor computer systems 22 each have a second high-level language program different from the others and different from the first program language. Thus SSI 24 is the first high level program language, IBM HCON 26 is the second high level language and American Airlines AAPI 28 is the third high level language, all of which are different from each other and different from the standard Shell interfaces 10. The SCIP translation device 32 that is interposed between the standard Shell interfaces 10 and the current HLLAPI 22 stores a plurality of translation command rules for performing each high-language level program designated by a program command signal generated by the computer system utilizing one of the standard Shell interfaces 10. The SCIP translation device 32 receives an input data signal in the first program language containing a vendor identification data portion and a program command data portion in the programming language of the UNIX-based first system and provides a corresponding output program command in the program language of any selected one of the vendor computer systems.

Figure 2:
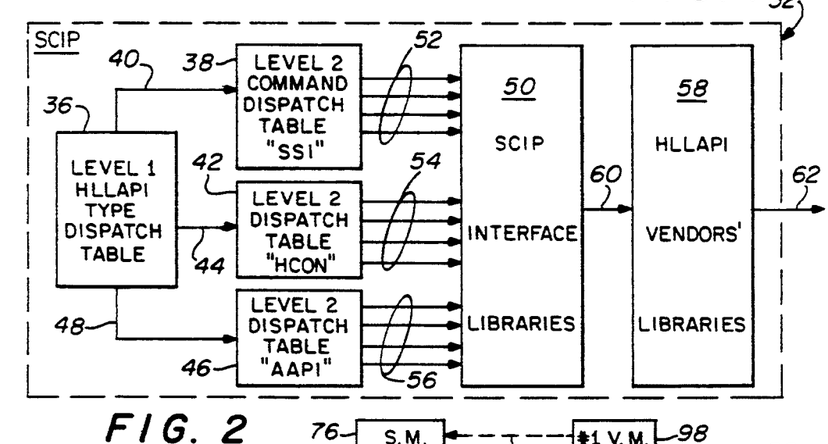
FIG. 2 is a block diagram of the novel SCIP translation device of the present invention.

The details of the SCIP translation device 32 are illustrated in FIG. 2. In translating one computer language to another, two basic elements must be known. The first is the type of language into which the first language is going to be converted and the second is a list of the commands that are to be performed by the computer having the second language. The translation device in FIG. 2 satisfies these two requirements by providing a level one HLLAPI type dispatch table 36 that stores in memory the different types of high level languages with which the table 36 can cooperate or access. For instance, there may be SSI, HCON and AAPI. This means that input data signal generated in the first language must have in the signal a vendor identification portion which identifies either SSI, HCON or AAPI. With that portion of the signal, the level one dispatch table 36 couples the command signal to the appropriate level 2 command dispatch table for the selected language as SSI, HCON or AAPI. Thus if the selected vendor identification portion of the data command signal designates SSI as the high-level language, in FIG. 2, the signal is coupled to level 2 command dispatch table 38 on line 40. Each of the n command dispatch units 38, 42 and 46 stores selected information for each command received and generates signals on line 52 representing particular high-level language functions to be performed by a selected one of the second plurality of vendor computer systems according to the program data portion of the input data signal. Thus the HLLAPI-type dispatch table 36 structure is defined as follows:

```
typedef struct_SCIP_   /* Dispatch table*/
   functions {         /* Emulator name   */
      char    *name;   *cmnd             /* Pointer to
         SCIP_cmnd_str
      command table*/
   }SCIP_fn_str;
```

The dispatch table 36 contains global commands (and the like), SSI commands, HCON commands, Sabre commands and user definable commands as follows:

```
SCIP_fn_str     SCIP_fn [ ] =
{
   { "global",  cmnd_global  },   /*Global commands    */
   { "ssi",     cmnd_ssi     },   /*SSI HLLAPI
                                     emulation          */
   { "hcon",    cmnd_hcon    },   /*SSI HLLAPI
                                     emulation          */
   { "sabre",   cmnd_sabre   },   /*Sabre AAPI
                                     emulation          */
   { "user",    cmnd_user    },   /*User definable
                                     commands           */
   { 0x00,      0x00         },
};
```

The command dispatch table structure for tables 38, 42 and 46 is as follows:

```
typedef struct_SCIP_cmnd{    /* Command table          */
    char    *name;           /* Command name           */
    int     (*func) ( );     /* Pointer to
                                command function       */
}SCIP_cmnd_str;
```

Each of the n command tables 38, 42 and 46 consists of an array of translation command structures containing pointers to string constants for each command name and a pointer to the appropriate function in the interface library 50. Each array is NULL terminated to provided an easily identifiable end of array marker. The command global array contains the following commands that are common to the SCIP translation device:

```
SCIP_cmnd_str cmnd_global [ ] =
{
    { OPEN,     mmOpen   },  /*Initialize conversation */
    { CLOSE,    mmClose  },  /*Terminate conversation  */
    { HELP,     mmHelp   },  /*Display help info.      */
    { ERRNO,    mmErrNo  },  /*Display error code
                               info.                   */
    { 0x00,     0x00     },
};
```

The command SSI array contains the commands that are specific to the SSI emulator as follows:

```
SCIP_cmnd_str cmnd_ssi [ ] =
{
    { SEARCH,   mmSearch_ssi  },  /*Search presen-
                                   tation space        */
    { SEND,     mmSend_ssi    },  /*Send string to
                                   host                */
    { CLEARKB,  mmCirKb_ssi   },  /*Clear keyboard
                                   lock cond.          */
    ...
    { 0x00,     0x00          },
};
```

The command HCON array contains the commands that are specific to the IBM HCON emulator as follows:

```
SCIP_cmnd_str cmnd_hcon [ ] =
{
    { SEARCH,   mmSearch_hcon },  /*Search pres-
                                   entation space      */
    { SEND,     mmSend_hcon   },  /*Send string to
                                   host                */
    { CLEARKB,  mmCirKb_hcon  },  /*Clear key-
                                   board lock
                                   cond.               */
    ...
    { 0x00,     0x00          },
};
```

The command Sabre array contains the commands that are specific to the American Airlines Sabre emulator as follows:

```
SCIP_cmnd_str cmnd_sabre [ ] =
{
    { SEARCH,   mmSearch_sabre },  /*Search pres-
                                    entation space     */
    { SEND,     mmSend_sabre   },  /*Send string to
                                    host               */
    { CLEARKB,  mmCirKb_sabre  },  /*Clear key-
                                    board lock
                                    cond.              */
    ...
    { 0x00,     0x00           },
};
```

The command user array is a place holder for user definable commands which will contain the "userstub" routine as follows:

```
SCIP_cmnd_str_cmnd_user [ ] =
{
    { "userstub",   mmUsrStub },
    { 0x00,         0x00      }
};
```

String literals used for command names are stored as #defined constants so that they can be declared once as follows:

```
/**************************************
 * Definitions for command string text *
 **************************************/
#define OPEN      "open"
#define CLOSE     "close"
#define HELP      "help"
#define SEARCH    "search"
#define SEND      "send"
#define CLEARKB   "clearkb"
...
```

The SCIP translation device help facility is implemented using a structure which contains pointers to arrays of SCIP help structures for SCIP translation device specific commands and user definable commands as follows:

```
struct
{
    SCIP_help_str  *global;
    SCIP_help_str  *user;
}mm_help = {help_global, help_user};
```

The SCIP translation device help structure is defined as follows:

```
typedef struct_SCIP_help {
    char   *name;    */ Command name  */
    char   *text;    */ Help text     */
}SCIP_help_str;
```

The help global array contains help information for the translation device specific commands as follows:

```
SCIP_help_str help_global [ ] =
{
    {OPEN,      OPEN_H     },
    {CLOSE,     CLOSE_H    },
    {SEARCH,    SEARCH_H   },
    {SEND,      SEND_H     },
    {CLEARKB,              CLEARKB_H },
    ...
    {0x00, 0x00};
};
```

The help user array contains help information for user definable commands as follows:

```
SCIP_help_str_help_user [ ] =
{
    {"UserStub",    "This is a sample of the
                    help text for user
                    API's."                  },
    {0x00, 0x00}                             }
};
```

String literals used for help text are defined as #defined constants so that they can be declared once as follows:

```
/*******************************
 * Definitions for help string text *
 *******************************/
#define OPEN_H      "type    sess  Initiate   host
                    session"
#define CLOSE_H     "type    sess  Terminate  host
                    session"
#define HELP_H      "[cmd]         Print this message."
#define SEARCH_H    "sl [t]        Search buffer for string
                                  s, loc 1, time-out t."
#define SEND_H      "s             Send string of keys to
                                  host."
#define CLEARKB_H   "             Clear keyboard."
#define CHECKCOMM_H "             Return communications
                                  status flag."
#define ERRNO_H     "             Explain hllapi error
                                  code."
...
```

The SSI emulator is able to communicate with the SCIP translation device via the parameters that are passed on the "open" command. The format of this command is as follows:

```
scip open scip_session_letter ssi "SSI MS3279
    variable" "SSI LS3279 variable"
    ssi_short_session_name
```

A shell script that uses an "open" must always include a "scip close" to clean up shared memory. The format of the closed command is as follows:

```
scip close
```

The translator device uses shared memory to save certain variables across Shell calls. In order for shared memory to be obtained, the Shell must set up the following memory variable:

```
SCIP_SHM
```

This variable is used to create a shared memory key file. This value is designated as "/tmp/scip.$$" in the SHELL.

The signals on lines 52, 54 and 56 from the n level 2 command dispatch tables 38, 42 and 46 respectively, are all coupled to the interface libraries 50. The interface library memory coupled to each of the command dispatch units 38, 42 and 46 store data in the first program language representing the plurality of high-level language command functions for each of the second vendor computer systems. In effect, the n level 2 command dispatch tables 38, 42 and 46 tell the interface library 50 what the command is and then the command searches the library 50 to see what is needed to complete the command. Thus, for each command received from the level 2 dispatch tables, a set of rules is stored in the interface library 50 that translates the command to the appropriate vendors' version of the command rules. The vendors' version is stored in the vendors' library 58. Thus the output of interface library on line 60 selects the appropriate vendors' version of the command portion of the input signal and that version is output on line 62 to the second computer system to operate the program command. Thus the vendor library memory 58 that is coupled to the interface library 50 through line 60 stores command function rules for each command in the second language to enable each of the second plurality of vendor computer systems to perform the command.

Figure 3:
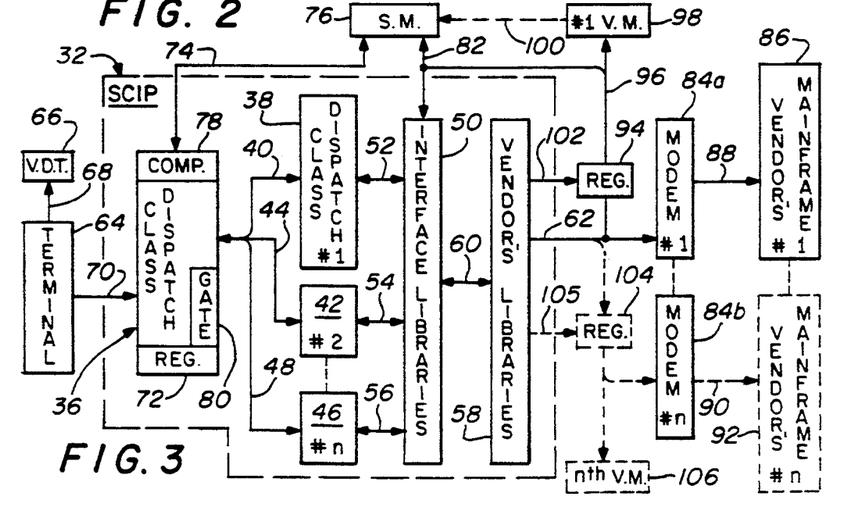
Figures 4, 5, 6:
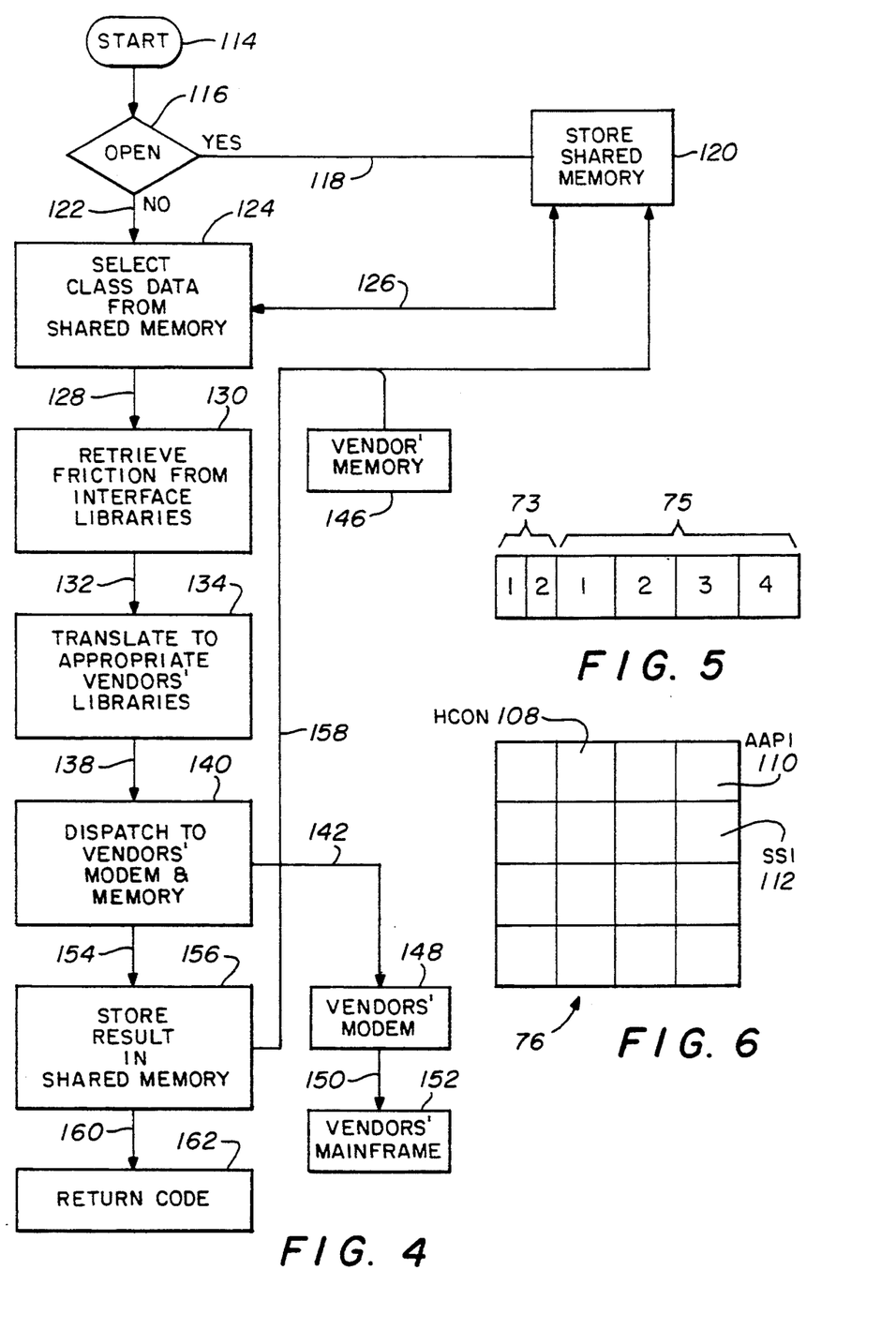
FIG. 4 is a flow chart illustrating the operation of the novel translation system of the present invention.
FIG. 5 illustrates the data command word containing a vendor identification data portion and a program command data portion.
FIG. 6 illustrates a shared memory having areas for storing connective information relative to the high-level language program data utilized by each of the plurality of second vendor computer systems.

The complete system for converting software commands generated in the UNIX based first programming language to software commands that operate in a second programming language environment is illustrated in FIG. 3. The SCIP translation device 32 is shown coupled to a terminal 64 which may utilize one of the standard Shell interfaces 10 illustrated in FIG. 1. A video data terminal 66 receives information from terminal 64 on line 68 and may include for instance a video display screen for viewing commands entered by terminal 64 in the translation device 32. Terminal 64 may include a keyboard for entering code data and instructions. The output of terminal 64 in a first programming language provides an input signal on line 70 to the first level dispatch table 36 in the translation device 32. The table 36 first checks to see if the input signal contains an "open" command signal meaning that this is going to be a new communication with a particular second high-level language computer device. That signal is stored in register 72 in the dispatch table 36. The signal is illustrated in FIG. 5 and includes a first portion 73 which is a vendor identification code and may include as many bits as desired. For simplicity, only 2 bits are shown in FIG. 5 as the vendor identification data code 73. The bits in the second portion 75 represent the command that is to be performed. A signal would normally be generated on line 74 to a shared memory 76 to determine if the identified vendor is currently running a program. In such case, a comparator 78 in the class dispatch table 36 compares the information in shared memory 76 with the vendor identification code 73 stored in register 72. Since there is an "open" command, the class dispatch table 36 knows this is a new program for a particular vendor computer system and table 36 stores the vendor identification in shared memory 36 via line 74. A gate device 80 in the first level dispatch unit 36 is coupled to the register 72, the comparator 78 and the shared memory 76 through lines 74 to transfer the vendor identification to the shared memory if the comparator 78 determines that the identified vendor is not currently running the program. This enables multiple programs to be run concurrently through a multiplexed arrangement of the incoming input signals. Thus if an identification code for SSI, HCON and AAPI are all stored in the shared memory, when a new command signal is generated by a terminal 64 designating SSI as the high-level language, if the command is an "open" signal, the first level dispatch unit 36 knows that this is starting a new communication in the SSI language. All subsequent commands will be routed to the SSI command dispatch unit in the second level such as unit 38 until a "close" command or another "open" command is received. If another open command is received the dispatch table 36 knows that this is a new communication for a new high-level language. It determines that language from the vendor identification code 73 in the command signal and consequently routes all commands to the command dispatch unit 38, 42 or 46 in the second level and all subsequent commands will be directed to that same command dispatch table for communication with the second high-level language controller until a "close" or another "open" command is received. Thus the shared memory allows multiple programs to be operating concurrently with multiplexed input signals.

When the interface library 50 receives the appropriate command from one of the command dispatch units 38, 42 or 46, it searches the shared memory 76 through line 82 to determine the status of the last command completed by the selected second computer system. It then knows which set of rules to transfer for the next command through line 60 to the vendors library 58 where again selected command function rules enable the selected one of the second plurality of vendor computer systems to perform the command. The output command function rules on line 62 are coupled to a modem 84a to the appropriate vendor mainframe 86 on line 88. As shown in phantom lines, there may be an n$^{th}$ modem 84b coupled to an n$^{th}$ vendor mainframe 92.

The result of the last command from the vendor libraries 58 on line 62 is also coupled through a register 94 and stored in shared memory 76 on line 96 so that the shared memory 76 keeps track of the operations being performed by the vendor mainframe. The results are also stored in the vendor's own memory 98. The vendor's memory 98 can communicate with the shared memory 76 via lines 100. The register 94 is gated with a signal 102 from the vendor libraries 58 to store the result of the performance of the function in shared memory 76. A like register 104 is gated by signals 105 to store the results of another mainframe operation in the n$^{th}$ vendor memory 106.

FIG. 6 is a schematic representation of the shared memory 76 illustrating the separate memory areas 108, 110 and 112, for example only, for storing HCON information, API information and SSI information respectively.

FIG. 4 is a flow chart of the process of the present invention by which a first computer using one of a plurality of standard Shell interface programming languages may communicate with one of a second plurality of second computers utilizing a particular HLLAPI language by means of the present invention. The program starts at 114 where a signal is generated to decision block 116 where it has to be determined if the command signal is an "open" command signal. If "yes", an area in shared memory is created and the class or vendor data information contained in the input signal is coupled through line 118 to shared memory 120 for storage in the created area. Thus the system knows that this is going to begin a series of new program commands. If the output of the decision device 116 is "no", a signal on line 122 is coupled to block 124 which selects the existing class or vendor data already stored in an area in the shared memory. In this case, the system knows that this is one of a continuation of commands of an ongoing program. The first level dispatch table, at step 124 simply accesses the shared memory 120 according to the data it received and retrieves the current status of the ongoing program. If it is a new program (an "open" command), the data just stored in shared memory 120 through line 118 is coupled to the class dispatch unit on line 126. Now knowing the class of HLLAPI language with which the system is going to communicate, the appropriate function rules are retrieved from the interface libraries at step 130. These rules are used at step 132 to translate the code to the appropriate rules stored in the vendor's library 134. The appropriate rules for translation are then dispatched, as indicated by line 138, to the vendor's modem and memory at step 140 for performing the designated command. Signals are coupled to vendor's modem 148 as indicated by line 140 and to the vendor's mainframe 152 as indicated by line 150. At step 156, the results are coupled to the shared memory for storage as indicated by line 158. The results are also stored in the vendor's memory at step 146. When the operation is completed as indicated by line 160, a return code is created at step 162 which indicates that the operation has been completed.

The SSI command rules are well known and as indicated earlier are stored as one set of rules in the interface library 50 in FIG. 3. The HLLAPI commands and the SABRE commands are not as well known and are set forth as follows:

HLLAPI Commands

OPEN
   SYNTAX:

```
scip open scip_session_letter ssi "SSI MS3279
   variable" "SSI LS3279 variable"
      ssi_short_session_name
   sciopen scip_session_letter ssi "SSI MS3279
   variable" "SSI LS3279 variable"
      ssi_short_session_name
```

DESCRIPTION:
The OPEN command activates a host session, allowing further communications with that session.
RETURN CODES:
0: successful completion
−1: invalid number of arguments
Non Zero: hllapi/sabre error

CLOSE
   SYNTAX

```
scip close session type
sciclose session type
```

DESCRIPTION:
The CLOSE command terminates a host session.
RETURN CODES:
0: successful completion
−1: invalid number of arguments
Non Zero: hllapi/sabre error

SEARCH
   SYNTAX

```
scip search string [loc] [timeout]
scisearch string [loc] [timeout]
```

DESCRIPTION:
SEARCH searches the presentation space for a specific character string. The search will begin at the location specified by the loc parameter. If the loc parameter is not specified the search will begin in row one column one. The string location will be return in STDOUT.
The timeout parameter will cause the SEARCH command to return after the specified time (in seconds) if the string was not found, otherwise the SEARCH will be performed once.

RETURN CODES:
0: successful completion
1: invalid number of arguments
Non Zero: string was not found or there was a hllapi error.

SEND
  SYNTAX:

```
scip send string_of_keys [string_of_keys
[string of keys] ] [-k special key] [-e encripted
value]
scisend string_of_keys [string_of_keys [string
of keys] ] [-k special key] [-e encripted value]
```

DESCRIPTION:
Sends keystrokes to the hosts. The arguments to SEND will be concatenated together then sent to the host. The '-k' option may be used to specify special purpose keys (i.e.: TAB, ENTER, etc.). The '-e' option may be used to provide an encrypted value, such a password which will be decoded at runtime prior to concatenating it into the string to be sent to host. (See SENDKEY for more info.)

RETURN CODES:
0: successful completion
−1: invalid number of arguments
Non Zero: hllapi error.

SETSESSION
  SYNTAX:

```
scip setsession session
scisetsession session
```

DESCRIPTION:
Changes the 3270 host session with which SCIP is attached.

RETURN CODES:
0: successful completion
Non Zero: shared memory error.

GETSTRING
  SYNTAX:

```
scip getstring length pos
scigetstring length pos
```

DESCRIPTION:
Copies a data string from the presentation space to STDOUT, for the specified length, starting at the specified position.

RETURN CODES:
0: successful completion
−1: invalid number of arguments
Non Zero: hllapi error.

SENDFILE
  SYNTAX:

```
scip sendfile source target
scisendfile source target
```

DESCRIPTION:
Uploads a file from the workstation to the host.
RETURN CODES:
0: successful completion
−1: invalid number of arguments
Non Zero: hllapi error.

GETFILE
  SYNTAX:

```
scip getfile source target
scigetfile source target
```

DESCRIPTION:
Downloads a file from the host to the workstation.

RETURN CODES:
0: successful completion
−1: invalid number of arguments
Non Zero: hllapi error.

QRYCURPOS
  SYNTAX:

```
scip qrycurpos
sciqrycurpos
```

DESCRIPTION:
Obtains the current linear cursor position and returns the information via STDOUT.

RETURN CODES:
0: successful completion
Non Zero: hllapi error.

CLEARKB
  SYNTAX:

```
scip clearkb
sciclearkb
```

DESCRIPTION
Clears the keyboard for the host.
RETURN CODES:
0: successful completion
Non Zero: hllapi error.

CHECKCOMM
  SYNTAX:

```
scip checkcomm
scicheckcomm
```

DESCRIPTION:
Checks for a communication error listed in the OIA.
RETURN CODES:
0: successful completion
9: communication error on host
Non Zero: communication error or hllapi

SENDKEY
  SYNTAX:

```
scip sendkey special_key
scisendkey special_key
```

DESCRIPTION:
Sends a special key the host. The following keys are supported:

| | | | | |
|---|---|---|---|---|
| RETURN | ENTER | TAB | BACKTAB | HOME |
| UP | DOWN | LEFT | RIGHT | CLEAR |
| RESET | ERASEEO | ERASEINP | ATTN | SYSREC |

-continued

F

RETURN CODES:
0: successful completion
−1: invalid number of arguments
Non Zero: hllapi error.
SETROWCOL
  SYNTAX:

```
scip setrowcol row col
scisetrowcol row col
```

DESCRIPTION:
Sets the cursor at row & column.
RETURN CODES:
0: successful completion
−1: invalid number of arguments
Non Zero: hllapi error.
SETLPOS
  SYNTAX

```
scip setipos position
scisetipos position
```

DESCRIPTION:
Sets cursor at the specific linear position, i.e., position 82 is row 1 column 2.
RETURN CODES:
0: successful completion
−1: invalid number of arguments
Non Zero: hllapi error.
PUTSTRING
  SYNTAX:

```
scip putstring string pos
sciputstring string pos
```

DESCRIPTION:
Copies of local string to the presentation space at the specified position.
RETURN CODES:
0: successful completion
−1: invalid number of arguments
Non Zero: hllapi error.
ORYOIA
  SYNTAX

```
scip qryoia
sciqryoia
```

DESCRIPTION:
Obtains the operator information line and passes it back via STDOUT.
RETURN CODES:
0: successful completion
−1: communication error on host
Non Zero: hllapi error.
ORYROW
  SYNTAX:

```
scip qrycow
sciqrycow
```

DESCRIPTION:
Obtains the row size of the presentation space and returns the information via STDOUT.
RETURN CODES:
0: successful completion
Non Zero: hllapi error.
ORYROL
  SYNTAX

```
scip qrycol
sciqrycol
```

DESCRIPTION:
Obtains the column size of the presentation space and returns the information via STDOUT.
RETURN CODES:
0: successful completion
Non Zero: hllapi error.

Sabre Commands

OPEN
  SYNTAX

```
scip open scip_session_letter sabre sabre_configuration_file
scipopen scip_session_letter sabre sabre_configuration_file
```

DESCRIPTION:
The OPEN command activates a host session, allowing further communications with that session. The 'sabre —configuration—file' contains Sabre parameters required to establish the connection to Sabre.
RETURN CODES:
0: successful completion
−1: invalid number of arguments
Non Zero: sabre error
CLOSE
  SYNTAX:

```
scip clos session type
sciclose session type
```

DESCRIPTION:
The CLOSE command terminates a host session.
RETURN CODES:
0: successful completion
−1: invalid number of arguments
Non Zero: sabre error
SEARCH
  SYNTAX:

```
scip search string [loc] [timeout]
scisearch string [loc] [timeout]
```

DESCRIPTION:
SEARCH searches the Sabre read buffer for a specific character string. The search will begin at the location specified by the loc parameter. If the loc parameter is not specified the search will begin in row one column one. The string location will be returned in STDOUT.

The timeout parameter will cause the SEARCH command to return after the specified time (in seconds) if the string was not found, otherwise the SEARCH will be performed once.

RETURN CODES:
0: successful completion
−1: invalid number of arguments
Non Zero: sabre was not found or there was a sabre error.

SEND
  SYNTAX:

```
scip sendstring_of_keys [string_of_keys
[string of keys]] [−e encripted value] [−f
target_file] [−a]
scisend string_of_keys [string_of_keys [string
of keys]] [−e encripted value] [−f target_
file] [−a]
```

DESCRIPTION:
Sends keystrokes to the host. The arguments to SEND will be concantenated together then sent to the host. The '-k' option may be used to specify special purpose keys (i.e.: TAB, ENTER, etc). The '-e' option may be used to provide an encrypted value, such a password which will be decoded at runtime prior to concatenating it into the string to be sent to the host. The '-f' option may be used to specify a target file to which the output of the command will be written. If the '-a' option is used, and a target filename is provided, then the file will be opened in append mde.

RETURN CODES:
0: successful completion
−1: invalid number of arguments
Non Zero: sabre error.

SENDFILE
  SYNTAX:

```
scip sendfile source target
scisendfile source target
```

DESCRIPTION:
Uploads a file from the workstation to the host.

RETURN CODES:
0: successful completion
−1: invalid number of arguments
Non Zero: sabre error.

GETFILE
  SYNTAX:

```
scip getfile string_of_keys [string_of_keys
[string of keys]] [−e encripted value] [−f
target_file] [−a]
scigetfile string_of_keys [string_of_keys
[string of keys]] [−e encripted value][[−f
target_file] [−a]
```

DESCRIPTION:
Sends keystrokes to the host. The arguments to SEND will be concantenated together then sent to the host. The '-k' option may be used to specify special purpose keys (i.e.: TAB, ENTER, etc). The '-e' option may be used to provide an encrypted value, such as a password which will be decoded at runtime prior to concatenating it into the string to be sent to the host. The '-f' option may be used to specify a target file to which the output of the command will be written. If the '-a' option is used, and a target filename is provided, then the file will be opened in append mde.

RETURN CODES:
0: successful completion
−1: invalid number of arguments
Non Zero: sabre error.

CHECKCOMM
  SYNTAX:

```
scip checkcomm
scicheckcomm
```

DESCRIPTION:
Checks for communication error listed in the OIA.

RETURN CODES:
0: successful completion
9: communication error on host
Non Zero: communication error or sabre error.

CHGSYS
  SYNTAX:

```
scip chgsys system
scip chgsys system
```

DESCRIPTION:
The CHGSYS command issues a sabre 'change:change:system' command to connect the user to another system.

RETURN CODES:
0: successful completion
Non Zero: command failed

CHGAREA
  SYNTAX:

```
scip chgarea area
scip chgarea area
```

DESCRIPTION:
The CHGAREA command issues a sabre 'change:change:area' command to connect the user to another Sabre area.

RETURN CODES:
0: successful completion
Non Zero: command failed

SETSESSION
  SYNTAX:

```
scip setsession session
scisetsession session
```

DESCRIPTION:
Changes the Sabre host session with which SCIP is attached.

RETURN CODES:
0: successful completion
Non Zero: shared memory error.

Thus there as has been disclosed a novel system for converting software commands generated in a UNIX-based first programming language environment to software commands that operate in a second programing language environment. A first computer system generates program input signals in the first program language for a communication with a plurality of second vendor computer systems each having a second high-level language program different from each other and from the first program language. A translation device is interposed between the first computer system and the plurality of second computer systems for storing a plurality of translation command rules for performing each high-level language program. The translation device receives a data input signal in the first program language that contains a vendor identification data portion and a program command data portion in the programming language of the UNIX-based first system and provides a corresponding output program command in the language of any one of the set of vendor computer systems. Thus the translator device translates a command to an appropriate vendor version of the command. The novel system allows multiple communication channels to be operated simultaneously in a multiplexed arrangement. Thus a particular input command locates the parameters for that command stored in an interface library in a particular high-level language and matches those parameters with the high-level language commands stored in the vendor's library. Thus the stored ruler or parameter in the interface libraries match the stored ruler or parameters of the vendor's libraries. The shared memory and the two-level dispatch system are the important elements that enable the translation device to function. Shared memory stores the information that the translation device requires to be able to translate the input signal command. Thus, it lets the system know, first, where the incoming data is to be dispatched and second, what was the last function performed for a given purpose because it stores ongoing program information for each computer system for which translation is occurring. The first level dispatch table couples the incoming data signals to the proper channel for the high-level language computer system selected and the second level dispatch table selects the proper conversion rules in the interface library for matching with the stored parameter in the vendor's library and allowing the conversion to take place.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A system for converting software commands generated in a UNIX-based first programming language environment to software commands that operate in a second programming language environment, the system comprising:
 a first computer system for gene rating input data signals in a first program language;
 a plurality of vendor second computer systems, each having a high-level second program language different from each other and different from the first program language;
 a vendor identification portion of said input data signals for selecting a desired one of the plurality of vendor second computer systems having a designated high-level language with which communication is to take place;
 a command data portion of said input data signals for designating a command function to be performed by the selected one of the plurality of vendor second computer systems;
 a plurality of command dispatch units, each unit generating selected output signals representing particular high-level language functions to be performed by a selected one of the plurality of vendor second computer systems according to the command data portion of the input data signal;
 a class dispatch unit for receiving said input data signal including the command data portion that designates a function to be performed by one of the plurality of vendor second computer systems and coupling the command data portion to a command dispatch unit designated by the vendor identification portion of the input data signal;
 an interface library memory coupled to each of the command dispatch units and storing sets of translation rules in the first program language representing a plurality of high-level language command functions to be performed by a selected one of the plurality of vendor second computer systems;
 a vendor library memory coupled to the interface library memory and storing corresponding matching command function rules in the second program language for each command in the first program language to enable each of the plurality of vendor second computer systems to perform the command; and
 a shared memory coupled to the interface library memory, the class dispatch unit, and the output of the vendor library for storing the current status of an on-going command function designated by said class dispatch unit to enable selection of the appropriate interface library translation rules that will match the appropriate vendor library command function rules and cause said command function to be performed by the selected one of the plurality of vendor second computer systems in its own program language.

2. A system as in claim 1 further comprising:
 data storage means in the class dispatch unit for receiving and storing the vendor identification data;
 comparator means in the class dispatch unit for comparing the stored vendor identification data with the current command status stored in the shared memory to determine if the vendor identified in the received data is currently running a program; and
 gate means coupled to the data storage means, the comparator means and the shared memory for transferring the vendor identification data to the shared memory if the comparator determines that the identified vendor is not currently running a program.

3. A system as in claim 2 further comprising data register means coupled to the output of the vendor's library for transferring the function of the last command results performed by any one of the plurality Of vendor second computer systems to the shared memory such that, with any succeeding input data signal, the shared memory may be accessed to determine the status of any vendor current program.

4. A system as in claim 1 wherein:
 the first program language includes a Shell interface such as a C Shell, BOURNE Shell and KORN Shell; and the second program high-level language includes a language such as SSI Express, HCON and AAPI.

5. A system as in claim 1 further including a memory area in the shared memory for each of the plurality of vendor second computer systems for storing the function of the last command results performed by a respective one of the plurality of vendor second computer systems such that subsequent input data signals for each of the plurality of vendor's second computer systems can be coupled to the class dispatch unit in multiplexed relationship to operate multiple vendor programs simultaneously.

6. The method of converting software commands generated in a UNIX-based first programming environment to software commands that operate in one of a plurality of second different programming environments on one of a plurality of vendor computer systems comprising the steps of:

generating an input data signal by a first computer system in a first program language that includes a vendor identification data portion and a command data portion representing a set of program instructions to be performed by a selected one of the plurality of vendor computer systems;

using the vendor identification portion of the input data signal to select one of a plurality of vendor computing systems to perform at least one function;

storing the vendor identification data in an area of shared memory to designate a program being currently operated;

establishing a plurality of communication channels, each channel generating selected output signals representing particular high-level language command functions to be performed by the selected one of the plurality of vendor computer systems according to the command data portion of the input data signal;

receiving the input data signal at a channel selection station and transferring the command data portion to a corresponding communication channel that corresponds with the vendor identification portion of the input data signal;

coupling an interface library memory to each of the plurality of communication channels and to a shared memory;

storing sets of translation rules in the interface library memory in the first program language representing a plurality of high-level language command functions to be performed by said selected one of the plurality of vendor computer systems;

coupling a vendor library memory to the interface library memory;

storing corresponding matching command function rules in the vendor library memory in the second program language for each command in the first program language to enable each of the plurality of vendor computer systems to perform the command in its own program language; and using the vendor identification data in the shared memory to select the appropriate interface library translation rules that will match the appropriate vendor library command function rules and cause a command function to be performed by the selected one of the plurality of vendor computer systems in its own program language.

7. A method as in claim 6 further comprising the steps of:

storing the received vendor identification data in the channel selection station;

comparing the received vendor identification data with current vendor identification data stored in the shared memory to determine if the identified vendor is currently running a program; and transferring the stored vendor identification data in the channel selection station to the shared memory if the identified vendor is not currently running a program.

8. A method as in claim 7 further comprising the step of coupling the output of the vendor's library to the shared memory for transferring a code representing the completion of the last command function performed by any one of the plurality of vendor computer systems to the shared memory such that upon receiving any succeeding command data portion of the input data signal, the shared memory may be accessed by the interface library to determine if any vendor is running a current program.

9. A method as in claim 6 further including the steps of:

using a shell interface such as C Shell, BOURNE Shell and KORN Shell as the first program language; and using a second program high-level language such as SSI Express, HCON and AAPI.

10. A method as in claim 9 further comprising the steps of providing a memory area in the shared memory for each of the plurality of vendor computer systems for storing the results of the last command function performed by a respective one of the plurality of vendor computer systems such that the subsequent input data signals for each of the plurality of vendor computer systems can be coupled to the channel selection station in multiplexed relationship to operate multiple vendor programs concurrently.

* * * * *